(12) United States Patent
Dontula et al.

(10) Patent No.: US 6,767,952 B2
(45) Date of Patent: *Jul. 27, 2004

(54) ARTICLE UTILIZING BLOCK COPOLYMER INTERCALATED CLAY

(75) Inventors: Narasimharao Dontula, Rochester, NY (US); Debasis Majumdar, Rochester, NY (US); Thomas N. Blanton, Rochester, NY (US); Mridula Nair, Rochester, NY (US); Dennis J. Massa, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 10/008,428

(22) Filed: Nov. 13, 2001

(65) Prior Publication Data

US 2004/0110884 A1 Jun. 10, 2004

(51) Int. Cl.$^7$ ................................................ C08K 3/34
(52) U.S. Cl. .................... 524/445; 524/447; 501/148
(58) Field of Search .............................. 524/445, 446, 524/447

(56) References Cited

U.S. PATENT DOCUMENTS

| | | | |
|---|---|---|---|
| 4,017,452 A | 4/1977 | Schwarz | |
| 4,739,007 A | 4/1988 | Okada et al. | |
| 4,810,734 A | 3/1989 | Kawasumi et al. | |
| 4,894,411 A | 1/1990 | Okada et al. | |
| 5,102,948 A | 4/1992 | Deguchi et al. | |
| 5,164,440 A | 11/1992 | Deguchi et al. | |
| 5,164,460 A | 11/1992 | Yano et al. | |
| 5,248,720 A | 9/1993 | Deguchi et al. | |
| 5,385,776 A | 1/1995 | Maxfield et al. | |
| 5,514,734 A | 5/1996 | Maxfield et al. | |
| 5,552,469 A | 9/1996 | Beall et al. | |
| 5,578,672 A | 11/1996 | Beall et al. | |
| 5,698,624 A | 12/1997 | Beall et al. | |
| 5,721,306 A | 2/1998 | Tsipursky et al. | |
| 5,747,560 A | 5/1998 | Christiani et al. | |
| 5,804,613 A | 9/1998 | Beall et al. | |
| 5,830,528 A | 11/1998 | Beall et al. | |
| 5,880,197 A | 3/1999 | Beall et al. | |
| 5,973,053 A | 10/1999 | Usuki et al. | |
| 6,579,927 B1 * | 6/2003 | Fischer | 524/445 |

OTHER PUBLICATIONS

A. Okada et al., Polym Prep., 1987, vol. 28, pp. 447–448.
Rachel Levy and C.W. Francis, Journal of Colloid And Interface Science, Mar. 1975, vol. 50 (3), 442–450.
D.J. Greenland, Journal of Colloid Science, vol. 18, 1963, pp. 647–664.
Richard A. Vaia et al., New Polymer Electrolyte Nanocomposites: Melt intercalation of polyethyleneoxide in mica type silicates, Advanced Materials, 7(2), 1995, pp. 154–156.
V. Mehrotra, E.P. Giannelis, Solid State Communications, 1991, vol. 77, No. 2, pp. 155–158.
Ed. T.J. Pinnavia and G.W. Beall, John Wiley & Sons, Ltd. Publishers, Polmer–Clay Nanocomposites, 2000.
H. van Olphen, John Wiley & Sons, Ltd. Publishers, An Introduction To Clay Colloid Chemistry, 1963, 1977.

* cited by examiner

Primary Examiner—Katarzyna Wyrozebski
(74) Attorney, Agent, or Firm—Lynne M. Blank

(57) ABSTRACT

An intercalated clay comprising a clay intercalated with a block copolymer wherein said block copolymer comprises a hydrophilic block capable of intercalating said clay. An additional embodiment is an article comprising a matrix polymer and clay wherein said clay is intercalated with a block copolymer, wherein said block copolymer comprises a hydrophilic block capable of intercalating said clay and a matrix compatible block compatible with said matrix polymer.

32 Claims, 1 Drawing Sheet

ARTICLE UTILIZING BLOCK COPOLYMER INTERCALATED CLAY

CROSS REFERENCE TO RELATED APPLICATIONS

Reference is made to commonly assigned, co-pending U.S. Patent Applications: Publication number 2003/0099815 by Dontula et al. filed of even date herewith entitled "Ethoxylated Alcohol Intercalated Smectite Materials and Method"; Publication Number 2003/0100656 by Majumdar et al filed of even date herewith entitled "Smectite Clay Intercalated with Polyether Block Polyamide Copolymer"; and Publication number 2003/0100655 by Nair filed of even dated herewith entitled "Polyester Nanocomposites", the disclosures of which are incorporated herein.

FIELD OF THE INVENTION

The invention relates to layered materials such as clay, which are intercalated by one or more block copolymer(s).

BACKGROUND OF THE INVENTION

Over the last decade or so, the utility of inorganic nanoparticles as additives to enhance polymer performance has been well established. Ever since the seminal work conducted at Toyota Central Research Laboratories, polymer-clay nanocomposites have generated a lot of interest across industry. The unique physical properties of these nanocomposites have been explored by such varied industrial sectors as the automotive industry, the packaging industry, and plastics manufactures. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, solvent uptake, etc. Some of the related prior art is illustrated in U.S. Pat. Nos. 4,739,007; 4,810,734; 4,894,411; 5,102,948; 5,164,440; 5,16,460 5,248,720; 5,854,326; and 6,034,163.

In general, the physical property enhancements for these nanocomposites are achieved with less than 20 vol. % addition, and usually less than 10 vol. % addition of the inorganic phase, which is typically clay or organically modified clay. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The clays in the polymer-clay nanocomposites are ideally thought to have three structures (1) clay tactoids wherein the clay particles are in face-to-face aggregation with no organics inserted within the clay lattice, (2) intercalated clay wherein the clay lattice has been expanded to a thermodynamically defined equilibrium spacing due to the insertion of individual polymer chains, yet maintaining a long range order in the lattice; and (3) exfoliated clay wherein singular clay platelets are randomly suspended in the polymer, resulting from extensive penetration of the polymer into the clay lattice and its subsequent delamination. The greatest property enhancements of the polymer-clay nanocomposites are expected with the latter two structures mentioned herein above.

There has been considerable effort towards developing materials and methods for intercalation and/or exfoliation of clays and other layered inorganic materials. In addition to intercalation and/or exfoliation, the clay phase should also be rendered compatible with the polymer matrix in which they are distributed. The challenge in achieving these objectives arises from the fact that unmodified clay surfaces are hydrophilic, whereas vast number of thermoplastic polymers of technological importance are hydrophobic in nature. Although intercalation of clay with organic molecules can be obtained by various means, compatibilizing these intercalated clays in a polymer matrix for uniform distribution still poses considerable difficulty. In the industry, the clay suppliers normally provide just the intercalated clays and the end-users are challenged to select materials and processes for compatibilizing these clays in the thermoplastics of their choice. This selection process involves trial and error at a considerable development cost to the end-users. Since clay intercalation and compatibilization in the matrix polymer usually involve at least two distinct materials, processes and sites, the overall cost of the product comprising the polymer-clay nanocomposite suffers.

A vast majority of intercalated clays are produced by interacting anionic clays with cationic surfactants including onium species such as ammonium (primary, secondary, tertiary, and quaternary), phosphonium, or sulfonium derivatives of aliphatic, aromatic or arylaliphatic amines, phosphines and sulfides. These onium ions can cause intercalation in the clay through ion exchange with the metal cations present in the clay lattice for charge balance. However, these surfactant molecules may degrade during subsequent melt-processing, placing severe limitation on the processing temperature and the choice of the matrix polymer. Moreover, the surfactant intercalation is usually carried out in the presence of water, which needs to be removed by a subsequent drying step.

Intercalation of clay with a polymer, as opposed to a low molecular weight surfactant, is also known in the art. There are two major intercalation approaches that are generally used—intercalation of a suitable monomer followed by polymerization (known as in-situ polymerization, see A. Okada et Al., *Polym Prep.*, Vol. 28, 447, 1987) or monomer/polymer intercalation from solution. Polyvinyl alcohol (PVA), polyvinyl pyrrolidone (PVP) and polyethylene oxide (PEO) have been used to intercalate the clay platelets with marginal success. As described by Levy et. al, in "Interlayer adsorption of polyvinylpyrrolidone on montmorillonite", *Journal of Colloid and Interface Science*, Vol 50 (3), 442, 1975, attempts were made to sorb PVP between the monoionic montmorillonite clay platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of polyvinyl alcohol by montmorrilonite", *Journal of Colloid Science*, Vol. 18, 647–664 (1963) discloses that sorption of PVA on the montmorrilonite was dependent on the concentration of PVA in the solution. It was found that sorption was effective only at polymer concentrations of the order of 1% by weight of the polymer. No further effort was made towards commercialization since it would be limited by the drying of the dilute intercalated layered materials. In a recent work by Richard Vaia et.al., "New Polymer Electrolyte Nanocomposites: Melt intercalation of polyethyleneoxide in mica type silicates", *Adv. Materials*, 7(2), 154–156, 1995, PEO was intercalated into Na-montmorillonite and Li- montmorillonite by heating to 80° C. for 2–6 hours to achieve a d-spacing of 17.7°Å. The extent of intercalation observed was identical to that obtained from solution (V. Mehrotra, E. P. Giannelis, *Solid State Commun.*, 77, 155, 1991). Other, recent work (U.S. Pat. No. 5,804,613) has dealt with sorption of monomeric organic compound having at least one carbonyl functionality selected from a group consisting of carboxylic acids and salts thereof, polycarboxylic acids and salts thereof, aldehydes, ketones and mixtures thereof. Similarly U.S. Pat. No. 5,880,197 discusses the use of an intercalating monomer that contains an amine or amide functionality or mixtures thereof. In both these patents, and other patents issued to the same group, the intercalation is performed at very dilute clay concentrations in a medium such as water, leading to a necessary and costly drying step, prior to melt-processing.

In order to further facilitate delamination and prevent reaggregation of the clay particles, these intercalated clays are required to be compatible with the matrix polymer in which they are to be incorporated. This can be achieved through the careful selection and incorporation of compatibilizing or coupling agents, which consist of a portion which bonds to the surface of the clay and another portion which bonds or interacts favorably with the matrix polymer. Compatibility between the matrix polymer and the clay particles ensures a favorable interaction which promotes the dispersion of the intercalated clay in the matrix polymer. Effective compatibilzation leads to a homogenous dispersion of the clay particles in the typically hydrophobic matrix polymer and/or an improved percentage of exfoliated or delaminated clay. Typical agents known in the art include general classes of materials such as organosilane, organozirconate and organotitanate coupling agents. However, the choice of the compatibilizing agent is very much dependent on the matrix polymer as well as the specific component used to intercalate the clay, since the compatibilizer has to act as a link between the two.

A survey of the art, makes it clear that there is a lack of general guideline for the selection of the intercalating and compatibilizing agents for a specific matrix polymer and clay combination. Even if one can identify these two necessary components through trial and error, they are usually incorporated as two separate entities, usually in the presence of water followed by drying, in a batch process and finally combined at a separate site with the matrix polymer during melt-processing of the nanocomposite. Such a complex process obviously adds to the cost of development and manufacturing of the final product comprising such a nanocomposite. There is a critical need in the art for a comprehensive strategy for the development of better materials and processes to overcome some of the aforementioned drawbacks.

Imaging elements such as photographic elements usually comprise a flexible thermoplastic base on which is coated the imaging material such as the photosensitive material. The thermoplastic base is usually made of polymers derived from the polyester family such as polyethylene terephthalate (PET), polyethylene naphthalate(PEN) and cellulose triacetate(TAC). Films for color and black and white photography, and motion picture print film are examples of imaging media comprising such flexible plastic bases in roll form. TAC has attributes of high transparency and curl resistance after processing but poor mechanical strength. PET on the other hand has excellent mechanical strength and manufacturability but undesirable post process curl. The two former attributes make PET more amenable to film thinning, enabling the ability to have more frames for the same length of film. Thinning of the film however causes loss in mechanical strength. The stiffness will drop as approximately the cube root of the thickness of the film. Also a photosensitive material coated on the base in a hydrophilic gelatin vehicle will shrink and curl towards the emulsion when dry. There is hence a need for a base that is thinner yet stiff enough to resist this stress due contraction forces. Films may also be subjected to excursions to high temperatures during use. Hence, a transparent film base that has dimensional stability at high temperatures due to its higher heat capacity is also highly desirable.

SUMMARY OF THE INVENTION

It is an object of the invention to provide an intercalated clay. It is a further object of the invention to provide an intercalated clay which further comprises a component compatible with a matrix polymer in which the clay can be dispersed. It is an even further object of the invention to provide an article comprising a matrix polymer and an intercalated clay wherein said intercalated clay comprises a matrix compatible component.

These and other objects of the invention are accomplished by providing an intercalated clay comprising a clay intercalated with a block copolymer wherein said block copolymer comprises a hydrophilic block capable of intercalating said clay. The present invention further includes an article comprising a matrix polymer and clay wherein said clay is intercalated with a block copolymer, wherein said block copolymer comprises a hydrophilic block capable of intercalating said clay and a matrix compatible block compatible with said matrix polymer. The clay may be a clay intercalated with an amphiphilic block copolymer. The amphiphilic block copolymer of the invention may also comprise a hydrophilic block capable of intercalating the clay. The block copolymer may further comprise a block that does not intercalate the clay or a block that is an oleophilic polymer.

DETAILED DESCRIPTION OF THE INVENTION

Figure 1:
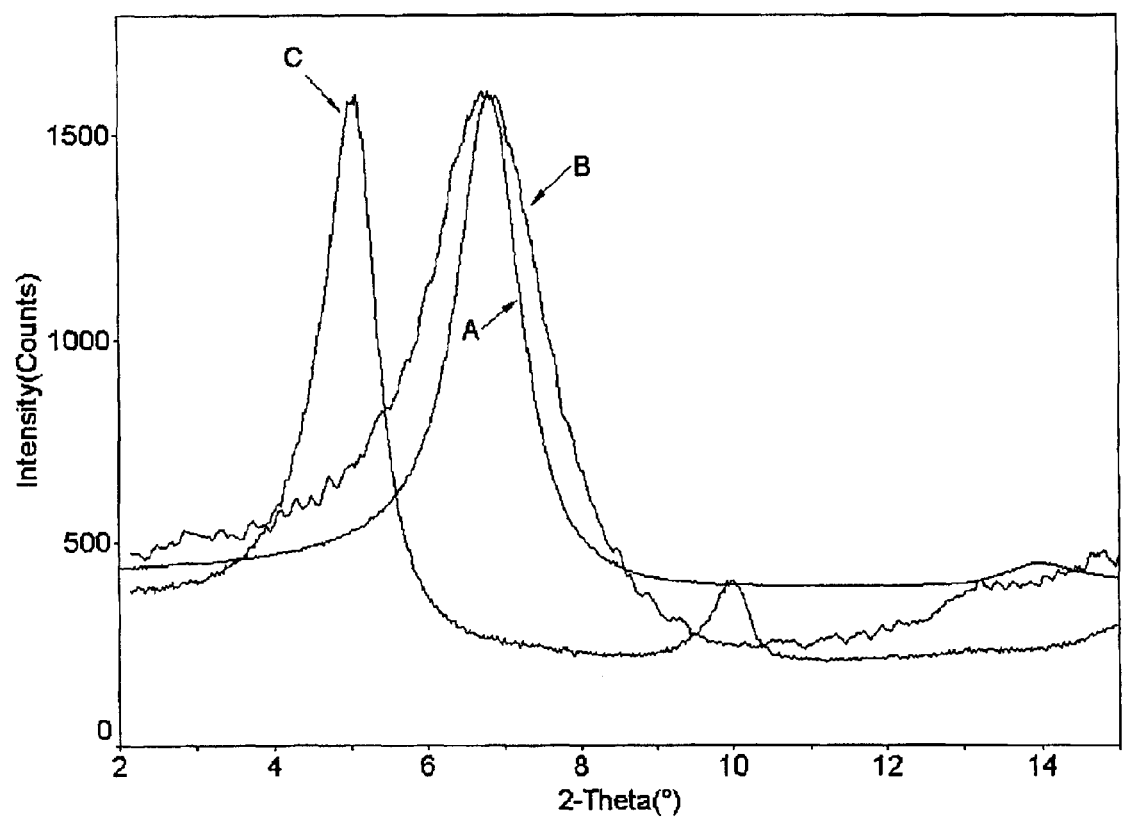
FIG. 1 shows XRD patterns from film samples of (A) NaCloisite clay (B) NaCloisite clay and polycaprolactone composite and (C) NaCloisite clay and poly(ethylene oxide-b-caprolactone)(PEO-b-PCL) composite.

The invention has numerous advantages. It provides an intercalated clay which can be effectively incorporated in a polymer-clay nanocomposite. Such polymer-clay nanocomposites can be further incorporated in an article of engineering application with improved physical properties such as improved modulus, tensile strength, toughness, impact resistance, electrical conductivity, heat distortion temperature, coefficient of linear thermal expansion, fire retardance, oxygen and water vapor barrier properties, and the like. The application of such articles in a number of industrial sectors, such as automotive, packaging, battery, cosmetics, etc. have been elucidated in the literature (vide, for example, "Polymer-clay Nanocomposites," Ed. T. J. Pinnavia and G. W. Beall, John Wiley & Sons, Ltd. Publishers).

The invention has an additional advantage of intercalating the clay with a block copolymer wherein one block is chosen to be a hydrophilic polymer which is capable of intercalating the clay. The clay surface being hydrophilic, this block has a natural affinity to the clay surface and can readily enter the clay lattice and intercalate the clay. The aforesaid block copolymer further comprises a matrix compatible block that is oleophilic. The aforesaid block copolymer even further comprises a block that does not intercalate or enter the clay lattice. Such a design of the block copolymer ensures that a component of the block copolymer will intercalate the clay and another component will compatibilize the intercalated clay with a hydrophobic matrix polymer. Thus, two necessary criteria of effectively dispersing clay in a polymer to form a desirable polymer-clay nanocomposite, namely clay intercalation and compatibilization, can be fulfilled by the choice of the block copolymer of this invention. The block copolymer, in essence, replaces two separate materials: clay intercalant and compatibilizer.

Another advantage of the invention arises from the fact that the block copolymer can be incorporated in the clay in an essentially dry state (i.e., without involving any aqueous medium). This feature eliminates the need for a costly and time consuming drying step in the preparation of the intercalated clay.

Another advantage of the invention derives from the fact that the clay, the block copolymer and the matrix polymer can all be combined in a single step in a suitable compounder, thus, adding greatly to the efficiency of the manufacturing process.

Another advantage of the invention is that it teaches of a general strategy wherein the chemistry of the block copolymer can be tailored according to the choice of the clay and the specific matrix polymer. Additionally, the molecular weights and the ratios of the blocks can be controlled easily to meet the processing conditions, such as temperature, shear, viscosity and product needs, such as various physical properties.

These and other advantages will be apparent from the detailed description below.

Whenever used in the specification the terms set forth shall have the following meaning:

"Nanocomposite" shall mean a composite material wherein at least one component comprises an inorganic phase, such as a smectite clay, with at least one dimension in the 0.1 to 100 nanometer range.

"Plates" shall mean particles with two comparable dimensions significantly greater than the third dimension, e.g, length and width of the particle being of comparable size but orders of magnitude greater than the thickness of the particle.

"Layered material" shall mean an inorganic material such as a smectite clay that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891, 611 (line 10, col.5–line 23, col. 7).

"Intercalant" shall mean the aforesaid foreign molecule inserted between platelets of the aforesaid layered material.

"Intercalated " shall refer to layered material that has at least partially undergone intercalation and/or exfoliation.

"Exfoliation" or "delamination" shall mean separation of individual platelets in to a disordered structure without any stacking order.

"Organoclay" shall mean clay material modified by organic molecules.

The clay material suitable for this invention can comprise any inorganic phase desirably comprising layered materials in the shape of plates with significantly high aspect ratio. However, other shapes with high aspect ratio will also be advantageous, as per the invention. The clay materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof Other useful layered materials include illite, mixed layered illite/smectite minerals, such as ledikite and admixtures of illites with the clay minerals named above. Other useful layered materials, particularly useful with anionic matrix polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag dope $V_2O_5$, $W_{0.2}V_{2.8}O7$, $Cr_3O_8$, $MoO_3(OH)_2$, $VOPO_4$—$2H_2O$, $CaPO_4CH_3$—$H_2O$, $MnHAsO_4$—$H_2O$, $Ag_6Mo_{10}O_{33}$ and the like. Preferred clays are swellable so that other agents, usually organic ions or molecules, can intercalate and/or exfoliate the layered material resulting in a desirable dispersion of the inorganic phase. These swellable clays include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred clays for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred clays include montmorillonite, hectorite and hydrotalcites, because of commercial availability of these materials.

The aforementioned clay can be natural or synthetic, for example synthetic smectite clay. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the clay particles should have a lateral dimension of between 0.01 $\mu$m and 5 $\mu$m, and preferably between 0.05 $\mu$m and 2 $\mu$m, and more preferably between 0.1 $\mu$m and 1 $\mu$m. The thickness or the vertical dimension of the clay particles can vary between 0.5 nm and 10 nm, and preferably between 1 nm and 5 nm The aspect ratio, which is the ratio of the largest and smallest dimension of the clay particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The clay used in this invention can be an organoclay. Organoclays are produced by interacting the unfumctionalized clay with suitable intercalants. These intercalants are typically organic compounds, which are neutral or ionic. Useful neutral organic molecules include polar molecules such as amides, esters, lactams, nitrites, ureas, carbonates, phosphates, phosphonates, sulfates, sulfonates, nitro compounds, and the like.

The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, which may be used in the practice of this invention.

The block copolymers of the invention are amphiphilic and have a hydrophilic and an oleophilic component. Further, the block copolymers of the invention can be of the two block or "A-B" type where A represents the hydrophilic component and B represents the oleophilic component or of the three block or "A-B-A" type. For example, the block copolymer may comprise three blocks and the matrix may comprise a copolymer or a blend of polymers compatible with at least one block of the copolymer. Also, where the matrix is a blend of polymers, individual polymers in the blend may be compatible with separate blocks of the copolymers. One presently preferred class of polymeric components that is useful for the hydrophilic component in this invention is poly(alkylene oxides) such as poly(ethylene oxide). The term poly(alkylene oxides) as used herein includes polymers derived from alkylene oxides such as poly(ethylene oxides) including mixtures of ethylene and propylene oxides. The most preferred is poly(ethylene oxide), because of its effectiveness in the present invention, its well-known ability to intercalate clay lattices through hydrogen bonding and ionic interactions, as well as its thermal processability and lubricity. The term poly(alkylene oxides) as used herein includes polymers derived from alkylene oxides such as poly(ethylene oxides) including mixtures of ethylene and propylene oxides. The most preferred is poly(ethylene oxide), mainly because of its effectiveness in the present invention, its commercial availability in a range of molecular weights and chemistries affording a wide latitude in the synthesis of the block copolymers.

Poly(ethylene oxides) are well known in the art and are described in, for example U.S. Pat. No. 3,312,753 at column 4. Useful (alkylene oxide) block contains a series of interconnected ethyleneoxy units and can be represented by the formula:

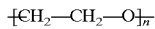

wherein the oxy group of one unit is connected to an ethylene group of an adjacent ethylene oxide group of an adjacent ethyleneoxy unit of the series.

Other useful hydrophilic components include poly 6, (2-ethyloxazolines), poly(ethyleneimine), poly (vinylpyrrolidone), poly(vinyl alcohol), polyacrylamides, polyacrylonitrile, polysaccharides and dextrans.

The oleophilic component or matrix compatible block of the polymers useful in the present invention can also be selected from many common components. The oleophilic component is characterized in that it is at least partially miscible in the matrix polymer of the invention, and/or interacts with the matrix polymer, for example, through transesterfication. In the case of a polyester matrix, the matrix compatible block comprises polyester. Exemplary oleophilic components can be derived from monomers in such as: caprolactone; propiolactone; β-butyrolactone; δ-valerolactone; ε-caprolactam; lactic acid; glycolic acid, hydroxybutyric acid, derivatives of lysine; and derivatives of glutaiic acid.

Other useful oleophilic components can be derived from α,β-ethylenically unsaturated monomers, such as olefins, styrenics and acrylates. Polymeric forms would include polycaprolactone; polypropiolactone; poly β-butyrolactone; poly δ-valerolactone; poly ε-caprolactam; polylactic acid, polyglycolic acid; polyhydroxybutyric acid; derivatives of polylysine; and derivatives of polyglutamic acid, polyolefins, polystyrene, polyacrylates, and polymers of α,β-ethylenically unsaturated monomers, such as olefins, styrenics and acrylates. Further, the oleophilic component or matrix compatible block will not intercalate the clay. Preferred components comprise polyester, polycaprolactone, polyamide, and polystyrene, because of their effectiveness in the present invention and compatibility with a wide rage of engineering thermoplastics.

The molecular weights of the hydrophilic component and the oleophilic component are not critical. A useful range for the molecular weight of the hydrophilic component is between about 300 and 50,000 and preferably 1,000 and 25,000. The molecular weight of the oleophilic component is between about 1,000 and 100,000 and preferably between 2,000 and 50,000. A preferred matrix compatible block comprises 50 to 500 monomer repeat units of caprolactone with a matrix polymer of polyester. Another preferred matrix compatible block comprises 25 to 100 monomer repeat units of ethylene with a matrix polymer of polyethylene. The preferred molecular weight ranges are chosen to ensure ease of synthesis and processing under a variety of conditions.

The matrix polymer of the invention can be any polymer but preferred to be thermoplastic polymers, copolymers or interpolymers and/or mixtures thereof, and vulcanizable and thermoplastic rubbers, because of their widespread use and effectiveness in the present invention.

Illustrative of useful thermoplastic resins are polylactones such as poly(pivalolactone), poly(caprolactone) and the like; polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'diphenylmethane diisocyanate, 3,3'-dimethyl-4,4'biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylnethane and the like and linear long-chain diols such as poly(tetrarnethylene adipate), poly (ethylene adipate), poly(1,4-butylene adipate), poly (ethylene succinate), poly(2,3-butylenesuccinate), polyether diols and the like; polycarbonates such as poly(methane bis(4-phenyl) carbonate), poly(1,1-ether bis(4-phenyl) carbonate), poly(diphenylmethane bis(4-phenyl)carbonate), poly(1,1-cyclohexanc bis(4-phenyl)carbonate), poly(2,2-(bis4-hydroxyphenyl) propane) carbonate, and the like, polysulfones; polyether ether ketones; polyamides such as poly (4-amino butylic acid), poly(hexamethylene adipamide), poly(6-aminohexanoic acid), poly(m-xylylene adipamide), poly(p-xylyene sebacamide), poly(2,2,2-trimethyl hexamethylene terephthalamide), poly (metaphenylene isophthalamide)(Nomex), poly(p-phenylene terephthalamide)(Kevlar), and the like; polyesters such as poly(ethylene azelate), poly(ethylene-1,5-naphthalate), poly(ethylene-2,6-naphthalate), poly(1,4-cyclohexane dimethylene terephthalate), poly(ethylene oxybenzoate)(A-Tell), poly(para-hydroxy benzoate) (Ekonol),poly(1,4-cyclohexylidene dimethylene terephthalate)(Kodel)(cis), poly(1,4-cyclohexylidene dimethylene terephthalate) (Kodel)(trans), polyethylene terephthlate, polybutylene terephthalate and the like; poly (arylene oxides) such as poly(2,6-dimethyl-1,4-phenylene oxide), poly(2,6-diphenyl-1,1phenylene oxide) and the like; poly(arylene sulfides) such as poly(phenylene sulfide) and the like; polyetherimides, vinyl polymers and their copolymers such as polyvinyl acetate, polyvinyl alcohol, polyvinyl chloride, polyvinyl butyral, polyvinylidene chloride, ethylene-vinyl acetate copolymers, and the like; polyaciylics, polyacrylate and their copolymers such as polyethyl acrylate, poly(n-butyl acrylate), polymethylrnethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated budadiene-styrene copolymers and the like; polyolefins such as (linear) low and high density poly (ethylene), poly(propylene), chlorinated low density poly (ethylene), poly(4-methyl-1-pentene), poly(ethylene), poly (styrene), and the like; ionomers; poly(epichlorohydrins); poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicycohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane), poly(dimethyl siloxane co-phenylmethyl siloxane), and the like; protein plastics; polyethers, polyimides; polyvinylidene halides; polycarbonates;, polyphenylenesulfides; polytetrafluoroethylene; polyacetals; polysulfonates; polyester ionomers; polyolefin ionomers. Copolymers and/or mixtures of these aforementioned polymers can also be used.

Vulcanizable and thermoplastic rubbers useful in the practice of this invention may also vary widely. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like as for example the copolymers in poly(styrene)-poly(butadiene)-poly(styrene) block copolymer manufactured by Shell Chemical Company under the trade name of Kraton.RTM. Copolymers and/or mixtures of these aforementioned polymers can also be used. Preferred matrix polymers for the present invention are thermoplastic polymers such as polyamides, polyesters, and polymers of alpha-beta unsaturated monomers and copolymers.

Polyamides, which may be used in the present invention, are synthetic linear polycarbonamides characterized by the presence of recurring carbonamide groups as an integral part of the polymer chain, which are separated from one another by at least two carbon atoms. Polyamides of this type include polymers, generally known in the art as nylons, obtained from diamines and dibasic acids having the recurring unit represented by the general formula:

—NHCOR$^1$COHNR$^2$— 

in which R$^1$ is an alkylene group of at least 2 carbon atoms, preferably from about 2 to about 11 or arylene having at least about 6 carbon atoms, preferably about 6 to about 17 carbon atoms,; and R$^2$ is selected from R$^1$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide)(nylon 6,6),poly (hexamethylene sebacamide)(nylon 6,10), poly (hexamethylene isophthalamide), poly(hexamethylene terephthalamide), poly(heptamethylene pimelamide)(nylon 7,7), poly(octamethylene suberamide)(nylon 8,8), poly (nonamethylene azelamide)(nylon 9,9) poly(decamethylene azelamide) (nylon 10,9), poly(decamethylene sebacamide) (nylon 10,10), poly(bis(4-amnino cyclohexyl)methane-1,10-decane-calboxamide)), poly(m-xylylene adipamide), poly(p-xylene sebacamide), poly(2,2,2-trimethyl hexamethylene terephthalamide), poly(piperazine sebacamide), poly (p-phenylene terephthalamide), poly(metaphenylene isophthalamide) and the like.

Other useful polyamides are those formed by polymerization of amino acids and derivatives thereof, as for example lactams. Illustrative of these useful polyamides are poly(4-aminobutyric acid)(nylon 4), poly(6-aminohexanoic acid) (nylon 6), poly(7-aminoheptanoic acid)(nylon 7), poly (8-aminooctanoic acid) (nylon 8), poly(9-aminononanoic acid)(nylon 9), poly(10-amino-decanoic acid) (nylon 10), poly(11-aminoundecanoic acid)(nylon 11), poly(12-aminododecanoic acid)(nylon 12) and the like.

Preferred polyamides for use in the practice of this invention include poly(caprolactam), poly(12-aminododecanoic acid), poly(hexamethylene adipamide), poly(m-xylylene adipamide), and poly(6-aminohexanoic acid) and copolymers and/or mixtures thereof, for their widespread application and effectiveness in the present invention.

Other polymers, which may be employed in the process of this invention, are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties is suitable for use in the process of this invention.

The particular polyester chosen for use can be a homopolyester or a co-polyester, or mixtures thereof as desired. Polyesters are normally prepared by the condensation of an organic dicarboxylic acid and an organic diols, and, therefore, illustrative examples of useful polyesters will be described herein below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and: may be cycloaliphatic, aliphatic or aromatic polyesters. Exemplary of useful cycloaliphatic, aliphatic and aromatic polyesters which can be utilized in the practice of their invention are poly(ethylene terephthalate), poly(cyclohexlenedimethylene), terephthalate) poly(ethylene dodecate), poly(butylene terephthalate), poly(ethylene naphthalate), poly(ethylene(2,7-naphthalate)), poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (Ekonol), poly(ethylene oxybenzoate)(A-tell), poly(ethylene isophthalate), poly(tetramethylene terephthalate, poly(hexamethylene terephthalate), poly(decamethylene terephthalate), poly(1,4-cyclohexane dimethylene terephthalate)(trans), poly(ethylene 1,5-naphthalate), poly(ethylene 2,6naphthalate), poly(1,4-cyclohexylene dimethylene terephthalate), (Kodel) (cis), and poly(1,4-cyclohexylene dimethylene terephthalate (Kodel)(trans).

Polyester compounds prepared from the condensation of a diol and an aromatic dicarboxylic acid are preferred for use in this invention. Illustrative of such useful aromatic carboxylic acids are terephthalic acid, isophthalic acid and a o-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor because it leads to polyesters that are less prone to degradation during melt processing and more dimensionally stable.

Preferred polyesters for use in the practice of this invention include poly(ethylene terephthalate), poly(butylene terephthalate), poly(1,4-cyclohexylene dimethylene terephthalate) and poly(ethylene naphthalate) and copolymers and/or mixtures thereof. Among these polyesters of choice, poly(ethylene terephthalate) is most preferred, because of its excellent mechanical strength, manufacturability, and effectiveness in the present invention.

Another set of useful thermoplastic polymers are formed by polymerization of alpha-beta-unsaturated monomers of the formula:

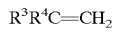

$$R^3R^4C=CH_2$$

wherein: $R^3$ and $R^4$ are the same or different and are cyano, phenyl, carboxy, alkylester, halo, alkyl, alkyl substituted with one or more chloro or fluoro, or hydrogen. Illustrative of such preferred polymers include polymers of ethylene, propylene, hexene, butene, octene, vinylalcohol, acrylonitrile, vinylidene halide, salts of acrylic acid, salts of methacrylic acid, tetrafluoroethylene, chlorotrifluoroethylene, vinyl chloride, styrene and the like. Copolymers and/or mixtures of these aforementioned polymers can also be used in the present invention.

Preferred thermoplastic polymers formed by polymerization of alpha-beta-unsaturated monomers for use in the practice of this invention are poly(propylene), poly(ethylene), poly(styrene) and copolymers and/or mixtures thereof, with poly(propylene) polymers and copolymers being most preferred for their low cost and good mechanical and surface properties.

For the practice of the present invention, it is important to ensure compatibility between the matrix polymer and at least one of the blocks of the copolymer used for clay intercalation. If the matrix polymer comprises a blend of polymers, the polymers in the blend should be compatible with at least one of the blocks of the copolymer used for clay intercalation. If the matrix polymer comprises copolymer(s), the copolymer(s) should be compatible with at least one of the blocks of the copolymer used for clay intercalation.

The clay and the block copolymer of the invention can be interacted for intercalation by any suitable means known in the art of making nanocomposites. For example, the clay can be dispersed in suitable monomers or oligomers, which are subsequently polymerized. Alternatively, the clay can be melt blended with the block copolymer, oligomer or mixtures thereof at temperatures preferably comparable to their melting point or above, and sheared. In another method, the clay and the block copolymer can be combined in a solvent phase to achieve intercalation, followed by solvent removal through drying. Of the aforesaid methods, the one involving melt blending is preferred, for ease of processing.

In a preferred embodiment of the invention the clay, together with any optional addenda, is melt blended with the block copolymer of the invention in a suitable twin screw compounder, to ensure proper mixing. An example of a twin screw compounder used for the experiments detailed below is a Leistritz Micro 27. Twin screw extruders are built on a building block principle. Thus, mixing of additives, residence time of resin, as well as point of addition of additives can be easily changed by changing screw design, barrel design and processing parameters. The Leistritz machine is such a versatile machine. Similar machines are also provided by other twin screw compounder manufacturers like Werner and Pfleiderrer, Berstorff etc. which can be operated either in the co rotating or the counter-rotating mode. The Leistritz Micro 27 compounder may be operated in the co-rotating or the counter rotating mode.

The screws of the Leistritz compounder are 27 mm in diameter, and they have a functionary length of 40 diameters. The maximum number of barrel zones for this compounder is 10. The maximum screw rotation speed for this compounder is 500 rpm. This twin screw compounder is provided with main feeders through which resins are fed, while additives might be fed using one of the main feeders or using the two side stuffers. If the side stuffers are used to feed the additives then screw design needs to be appropriately configured. The preferred mode of addition of clay to the block copolymer is through the use of the side stuffer, to ensure intercalation of the clay through proper viscous mixing and to ensure dispersion of the filler through the polymer matrix as well as to control the thermal history of the additives. In this mode, the block copolymer is fed using the main resin feeder, and is followed by the addition of clay through the downstream side stuffer. Alternatively, the clay and block copolymer can be fed using the main feeders at the same location.

In yet another embodiment of the invention, the clay, the block copolymer and the matrix polymer together with any optional addenda are melt blended in a suitable twin screw compounder. One of the preferred modes of addition of clay and the block copolymer to the matrix polymer is by the use of side stuffers to ensure intercalation of the clay through proper viscous mixing; the block copolymer first followed by the addition of clay through the downstream side stuffer or vice versa. The mode of addition will be determined by characteristics of the block copolymer. Alternatively, the clay and block copolymer are premixed and fed through a single side stuffer This method is particularly suitable if there is only one side stuffer port available, and also there are limitations on the screw design. Also preferred are methods where the clay and block copolymer are fed using the main feeders at the same location as the matrix resin.

In another preferred embodiment of the invention, the clay, together with any optional addenda, is melt blended with the block copolymer of the invention using any suitable mixing device such as a single screw compounder, blender, mixer, spatula, press, extruder, molder.

In the formation of an article comprising a suitable matrix polymer and the intercalated clay of the invention, any method known in the art including those mentioned herein above can be utilized.

The end product of the instant invention, comprising the clay, the block copolymer and the matrix polymer together with any optional addenda, can be formed by any suitable method such as, extrusion, co-extrusion with or without orientation by uniaxial or biaxial, simultaneous or consecutive stretching, blow molding, injection molding, lamination, solvent casting, and the like.

The optional addenda mentioned herein above can include nucleating agents, fillers, plasticizers, impact modifiers, chain extenders, colorants, lubricants, antistatic agents, pigments such as titanium oxide, zinc oxide, talc, calcium carbonate, etc., dispersants such as fatty amides, (e.g., stearamide), metallic salts of fatty acids, e.g., zinc stearate, magnesium stearate, etc., dyes such as ultramarine blue, cobalt violet, etc., antioxidants, fluorescent whiteners, ultraviolet absorbers, fire retardants, roughening agents, cross linking agents, voiding agents and the like. These optional addenda and their corresponding amounts can be chosen according to need.

Any method known in the art including those mentioned herein above can be utilized to form an article of the invention comprising a matrix polymer and the intercalated clay of the invention and other optional addenda. Such methods of formation include but are not limited to extrusion, co-extrusion with or without orientation by uniaxial or biaxial, simultaneous or consecutive stretching, blow molding, injection molding, lamination, solvent casting, coating, drawing, spinning.

The article of the invention can be of any size and form, such as sheet, rod, particulate, powder, fiber, wire, tube, woven, non-woven, support, layer in a multilayer structure, and the like. The article of the invention can be used for any purpose such as packaging, woven or non-woven products, protective sheets or clothing, medical implement In one preferred embodiment of the invention, the article of the invention comprises the base of an imaging member. Such imaging members include those utilizing photographic, electrophotographic, electrostatographic, photothermographic, migration, electrothermographic, dielectric recording, thermal dye transfer, inkjet and other types of imaging. In a more preferred embodiment of the invention, the article of the invention comprises the base of photographic imaging members, particularly photographic reflective print material, such as paper, and other display products.

Typical bases for imaging members comprise cellulose nitrate, cellulose acetate, poly(vinyl acetate), polystyrene, polyolefins, poly(ethylene terephthalate), poly(ethylene naphthalate), polycarbonate, polyamide, polyimide, glass, natural and synthetic paper, resin-coated paper, voided polymers, microvoided polymers and microporous materials, fabric, etc. The material of the invention comprising a matrix polymer and the intercalated clay can be incorporated in any of these materials and/or their combination for use in the base of the appropriate imaging member. In case of a multilayered imaging member, the aforementioned material of the invention can be incorporated in any one or more layers, and can be placed anywhere in the imaging support, e.g., on the topside, or the bottom side, or both sides, and/or in between the two sides of the support. The method of incorporation can include extrusion, co-extrusion with or without stretching, blow molding, casting, co-casting, lamination, calendering, embossing, coating, spraying, molding, and the like. The image receiving layer, as per the invention, can be placed on either side or both sides of the imaging support.

In one preferred embodiment, the imaging support of the invention comprising a matrix polymer and the intercalated clay of the invention may be formed by extrusion and/or co-extrusion, followed by orientation, as in typical polyester based photographic film base formation. Alternatively, a composition comprising a matrix polymer and the intercalated clay of the invention can be extrusion coated onto another support, as in typical resin coating operation for photographic paper. Yet in another embodiment, a composition comprising a matrix polymer and the intercalated clay of the invention can be extruded or co- extruded, preferably oriented, into a preformed sheet and subsequently laminated to another support, as in the formation of typical laminated reflective print media.

In a preferred embodiment, the material of this invention is incorporated in imaging supports used for image display such as reflective print media including papers, particularly resin-coated papers, voided polymers, and combinations thereof. Alternatively, the imaging support may comprise a combination of a reflective medium and a transparent medium, in order to realize special effects, such as day and night display. In a preferred embodiment, at least one layer comprising the material of the present invention is incorporated in a support comprising paper, because of its widespread use. In another preferred embodiment, at least one layer comprising the nanocomposite of the present invention is incorporated in an imaging support comprising a voided polymer, because of its many desirable properties such as tear resistance, smoothness, improved reflectivity, metallic sheen, day and night display usage.

The imaging supports of the invention can comprise any number of auxiliary layers. Such auxiliary layers may include antistatic layers, back mark retention layers, tie layers or adhesion promoting layers, abrasion resistant layers, conveyance layers, barrier layers, splice providing layers, UV absorption layers, antihalation layers, optical effect providing layers, waterproofing layers, and the like.

The weight ratio of the clay: block copolymer can vary from 1:99 to 99:1. However it is preferred to be between 90:10 to 50:50 and more preferred to be between 80:20 and 60:40 in order to optimize the desirable physical properties of clay and the intercalation afforded by the block copolymer.

The following examples illustrate the practice of this invention. They are not intended to be exhaustive of all possible variations of the invention. Parts and percentages are by weight unless otherwise indicated.

EXAMPLES

The following examples highlight the observation of intercalation of smectite clays using block copolymer. The clays used are: NaClosite, which is a natural montmorillonite and Cloisite 25A, which is a montmorillonite-based organoclay (both from Southern Clay Products). The polycaprolactones used in the examples are purchased from Aldrich. The block copolymers poly(ethylene oxide-b-caprolactone)(PEO-b-PCL) are prepared according to the procedure described below. (PEO-b-PCL) with PEO: PCL molecular weight ratio of 5K: 20K, henceforth will be referred to as (PEO-b-PCL 5K–20K)

Poly(ethylene glycol) monomethyl ether (5K, 125 gms, purchased from Aldrich) is degassed and dried under reduced pressure at 100° C. in a 3-neck round bottom flask for one hour. It is then dissolved at room temperature in toluene (<0.001% water, 500 mls) under argon to give a 20% solution of the polymer and subsequently treated with 3 mls stannous octanoate catalyst (purchased from Sigma). The appropriate amount of ε-caprolactone (500 mls, 99%, purchased from Acros) is introduced into the reaction mixture, under argon using a transfer syringe and polymerized at 100–110° C. for 12 hrs. The polymer solution is then precipitated into large amounts of diethyl ether and filtered. (PEO-b-PCL) with PEO: PCL molecular weight ratio of 5K: 10K, henceforth to be referred to as (PEO-b-PCL 5K–10K)

These block copolymers are prepared following the same procedure as for (PEO-b-PCL 5K–20K), except using an appropriately less amount of caprolactone to attain a molecular weight of 10K.

The initial (001) basal plane spacing in ambient air for NaCloisite is 13 Å and for Cloisite 25A is 21 Å. An increase in the (001) basal plane spacing is evidence of intercalation and is measured by X-ray diffraction using a Rigaku Bragg-Brentano diffractometer utilizing a monochromator tuned to CuKα radiation.

The clay and block copolymer are weighed and combined at temperatures above the melting point of the block copolymer. The clay and block copolymer can be premixed before heating or the block copolymer can be melted first followed by addition of clay. An alternative method is to add clay during heating.

Examples 1–3

Samples Ex. 1–3 are prepared by weighing predetermined amounts of NaCloisite clay and PEO-b-PCL into a glass container. The mixtures are heated in an oven at 70° C., mixed with a spatula, heated on a hotplate, then mixed again with a spatula and cooled to ambient temperature (21° C). An aliquot of each Ex. 1–3 in the solid state is placed between two polytetfluoroethylene or polyimide sheets then pressed using a Carver press, with heated plates held at 175° C. The resulting film samples are analyzed by XRD for (001) basal plane spacing. XRD results for Ex. 1–3 and NaCloisite clay are summarized in Table 1. The data indicate that PEO-PCL does intercalate the NaCloisite clay, as reflected in an increase in the (001) basal plane spacing.

TABLE 1

| Sample | Clay Used | Block Copolymer Used | PEO Molecular wt. | PCL Molecular wt | Clay:Block Copolymer wt. ratio | (001) Spacing |
|---|---|---|---|---|---|---|
| Ex. 1 | Na Cloisite | PEO-b-PCL 5K–20K | 5000 | 20000 | 12.5:87.5 | 18 Å |
| Ex. 2 | Na Cloisite | PEO-b-PCL5K–20K | 5000 | 20000 | 25:75 | 18 Å |
| Ex. 3 | Na Cloisite | PEO-b-PCL 5K–20K | 5000 | 20000 | 50:50 | 18 Å |
| | Na Cloisite | none | | | 100:0 | 13 Å |

Examples 4–6

Samples Ex. 4–6 are prepared by weighing predetermined amounts of NaCloisite or Cloisite 25A clay and PEO-B-PCL into separate glass containers. The PEO-b-PCL is heated on a hotplate until the PEO-b-PCL melted. Clay is added to this molten polymer and is mixed with a spatula, reheated and mixed again with a spatula An aliquot of each sample Ex. 4–6 in the liquid state is deposited onto a glass microscope slide then smeared to make a film and allowed to cool to ambient temperature (21° C). The resulting film samples are analyzed by XRD for (001) basal plane spacing. XRD results for Ex. 4–6 and NaCloisite and Cloisite 25A clay are summarized in Table 2. The data indicate that PEO-b-PCL intercalates both NaCloisite, which is a natural clay and Cloisite 25A, which is an organoclay.

TABLE 2

| Sample | Clay Used | Block Copolymer Used | PEO Molecular wt. | PCL Molecular wt | Clay:Block Copolymer wt. ratio | (001) Spacing |
|---|---|---|---|---|---|---|
| Ex. 4 | Na Cloisite | PEO-b-PCL 5K–10K | 5000 | 10000 | 12.5:87.5 | 18 Å |
| Ex. 5 | Na Cloisite | PEO-b-PCL 5K–20K | 5000 | 20000 | 12.5:87.5 | 18 Å |
| Ex. 6 | Cloisite 25A | PEO-b-PCL 5K–20K | 5000 | 20000 | 12.5:87.5 | 32 Å |
| | Na Cloisite | None | | | 100:0 | 13 Å |
| | Cloisite 25A | None | | | 100:0 | 21 Å |

Examples 7–8

Samples Ex. 7–8 are prepared using an internal batch mixer like a Brabender. Other high intensity internal batch mixers like a Banbury can also be used In these experiments, the batch mixer is heated to the temperature required to process polyethylene terephthalate (PET), this being around 276° C.–282° C. for the grade PET 7352 (Eastman Chemical Company). Initially the PET is charged to the mixer. To the softened PET is added the block copolymer PBO-B-PCL and then the NaCloisite clay is added. An aliquot of each sample Ex. 7–8 in the solid state is placed between two polytetrafluoroethylene or polyimide sheets then pressed using a Carver press, with heated plates held at 245° C. The resulting film samples are analyzed by XRD for (001) basal plane spacing. XRD results for Ex. 7–8 are summarized in Table 3. The data indicate that PEO-b-PCL does intercalate the NaCloisite clay in the PET matrix.

Samples Ex. 1–8 also demonstrate that the intercalation of clay with PEO-b-PCL can be accomplished by a number of mixing methods, and the (001) basal plane spacing is not particularly sensitive to the method of melt intercalation.

TABLE 3

| Sample | Clay Used | Block Copolymer Used | PEO Molecular wt. | PCL Molecular wt. | matrix polymer | Clay:Block copolymer: PET wt. ratio | (001) Spacing |
|---|---|---|---|---|---|---|---|
| Ex. 7 | NaCloisite | PEO-b-PCL 5 K–10 K | 5000 | 10000 | PET | 4:9:87 | 17 Å |
| Ex. 8 | NaCloisite | PEO-b-PCL 5 K–20 K | 5000 | 20000 | PET | 4:9:87 | 18 Å |

Comparative Samples 1–6

Comparative samples Comp. 1–6 are prepared by weighing predetermined amounts of NaCloisite clay and polycaprolactone (PCL) of different molecular wt. into a glass container. The mixtures are heated in an oven at 70° C., mixed with a spatula, heated on a hotplate, then mixed again with a spatula and cooled to ambient temperature (21° C.). An aliquot of each Comp 1–6 in the solid state is placed between two polytetrafluoroethylene or polyimide sheets then pressed using a Carver press, with heated plates held at 175° C. The resulting film samples are analyzed by XRD for (001) basal plane spacing. XRD results for Comp. 1–6 are summarized in Table 4. The data indicate that PCL does not intercalate the NaCloisite clay. This phenomenon is independent of the molecular weight of the PCL.

TABLE 4

| Sample | Clay Used | Polymer Used | PCL Molecular wt. | Clay:PCL Wt. ratio | (001) Spacing |
|---|---|---|---|---|---|
| Comp. 1 | NaCloisite | PCL | 10000 | 5:95 | 13 Å |
| Comp. 2 | NaCloisite | PCL | 10000 | 10:90 | 13 Å |
| Comp. 3 | NaCloisite | PCL | 42000 | 5:95 | 13 Å |
| Comp. 4 | NaCloisite | PCL | 42000 | 10:90 | 13 Å |
| Comp. 5 | NaCloisite | PCL | 80000 | 5:95 | 13 Å |
| Comp. 6 | NaCloisite | PCL | 80000 | 10:90 | 13 Å |

Comparative Sample 7

Comparative sample Comp. 7 is prepared similar to samples Ex. 7 but without the block copolymer PEO-B-PCL of the invention. An aliquot of Comp. 7 in the solid state is placed between two polyimide sheets then pressed using a Carver press, with heated plates held at 260° C. The resulting film sample is analyzed by XRD for (001) basal plane spacing. The XRD result for Comp. 7 is summarized in Table 5. The data indicate that polyethylene terephthalate (PET), by itself, without the block copolymer of the invention, does not intercalate the NaCloisite clay. The data also indicate that the processing conditions utilized result in a reduction in the (001) basal plane spacing, possibly because of loss of lattice water.

TABLE 5

| Sample | Clay Used | Block Copolymer Used | matrix polymer | Clay:Block copolymer: PET wt. ratio | (001) Spacing |
|---|---|---|---|---|---|
| Comp. 7 | NaCloisite | none | PET | 4:0:96 | 10 Å |

Thermal analysis of PEO-b-PCL 5K–20K and its blend with PET.

Samples of (1) neat PEO-b-PCL 5K–20K and (2) a blend of PEO-b-PCL 5K–20K and PET in a 25:75 weight ratio, prepared similar to sample Ex. 8, are analyzed by differential scanning calorimetry. The melting point Tm of PEO and PCL are listed in Table 6. It is clear that although in the pure block copolymer the PEO and the PCL blocks have distinct melting points, in the blend no melting point is observed for the PCL block indicating its miscibility in the PET matrix. Additionally, the heat of fusion ΔHf of the block copolymer in the blend (containing 25% of the block copolymer), is found to be less than 25% of the ΔHf of the neat block copolymer. This finding further supports the miscibility of PCL in PET. It is postulated that the reduction in ΔHf of the blend arises from the inability of the PCL block to crystallize, as it mixes with the matrix PET.

TABLE 6

| Sample | PEO-b-PCL 5K-20K:PET wt. Ratio | Tm (PCL) | Tm (PEO) |
|---|---|---|---|
| Sample 1 | 100:0 | 29.5° C. | 52.3° C. |
| Sample 2 | 25:75 | None detected | 55.3° C. |

FIG. 1 shows XRD patterns from film samples of (A) NaCloisite clay (B) NaCloisite clay and PCL composite with 10 weight percent NaCloisite and 90 weight percent PCL (sample Comp.6) and (C) NaCloisite and poly(ethylene oxide-b-caprolactone)(PEO-b-PCL 5K–20K) with 12.5 weight percent NaCloisite and 87.5 weight percent PEO-b-PCL 5K–20K (sample Ex.5). The XRD data in FIG. 1 show that only the sample prepared in accordance with the instant invention (sample Ex. 5, curve C in FIG. 1) has a significant shift in diffraction peak position to lower 2θ(°). This peak shift is a result of intercalation of the NaCloisite clay by the PEO-BPCL block copolymer.

The invention has been described in detail with particular reference to certain preferred embodiments thereof, but it will be understood that variations and modifications can be effected within the spirit and scope of the invention.

What is claimed is:

1. An imaging member comprising a matrix polymer and clay wherein said clay is intercalated with a block copolymer, wherein said block copolymer comprises a hydrophilic block capable of intercalating said clay and a matrix compatible block compatible with said matrix polymer, wherein said block copolymer comprises three blocks.

2. The imaging member of claim 1 wherein said block copolymer further comprises a block that does not intercalate clay.

3. The imagine member of claim 1 wherein said block copolymer further comprises a block comprising an oleophilic polymer.

4. The imaging member of claim 1 wherein said hydrophilic block comprises at least one member selected from the group consisting of poly(alkylene oxide), poly 6, (2-ethyloxazolines), poly(ethyleneimine), poly(vinylpyrrolidone), poly(vinyl alcohol), polyacrylamides, polyacrylonitrile, polysaccharides and dektrans.

5. The imaging member of claim 1 wherein said hydrophilic block comprises poly(ethylene oxide).

6. The imaging member of claim 1 wherein said hydrophilic block comprises polysaccharide.

7. The imaging member of claim 1 wherein said hydrophilic block comprises polyvinyl pyrrolidone.

8. The imaging member of claim 1 wherein said matrix compatible block consists of at least one member selected from the group consisting of polycaprolactone, polypropiolactone, poly β-butyrolactone, poly δ-valerolactone, poly ε-caprolactan, polylactic acid, polyglycolic acid, polyhydroxybutyric acid, polylysine polyglutamic acid, and polymers of α, β-ethylenically unsaturated monomers.

9. The imaging member of claim 1 wherein said matrix compatible block comprises polyester.

10. The imaging member of claim 1 wherein said matrix compatible block comprises polycaprolactone.

11. The imagine member of claim 1 wherein said matrix compatible block comprises polyamide.

12. The imaging member of claim 1 wherein said matrix compatible block comprises polystyrene.

13. The imaging member of claim 1 wherein said clay comprises smectite clay.

14. The imaging member of claim 1 wherein said clay comprises synthetic smectite clay.

15. The imaging member of claim 1 wherein said clay comprises layered double hydroxide clay.

16. The imaging member of claim 1 wherein said block copolymer comprises three blocks and said matrix comprises a copolymer compatible with at least one block of said block copolymer.

17. The imaging member of claim 1 wherein said block copolymer comprises three blocks and said matrix comprises a blend of polymers compatible with at least one block of said block copolymer.

18. The imaging member of claim 17 wherein individual polymers in the blend of copolymers are compatible with separate blocks of said block copolymers.

19. The imaging member of claim 1 wherein said matrix compatible block comprises 50 to 500 monomer repeat units of caprolactone and said matrix polymer comprises polyester.

20. The imaging member of claim 1 wherein said matrix compatible block comprises 25 to 100 monomer repeat units of ethylene and said matrix polymer comprises polyethylene.

21. An imaging member comprising a matrix polymer and clay wherein said clay is intercalated with a block copolymer, wherein said block copolymer comprises a hydrophilic block capable of intercalating said clay and a matrix compatible block compatible with said matrix polymer, wherein said block copolymer comprises two blocks.

22. An imaging member comprising a base material comprising a matrix polymer and clay wherein said clay is intercalated with a block copolymer, wherein said block copolymer comprises a hydrophilic block capable of intercalating said clay and a matrix compatible block compatible with said matrix polymer.

23. The imaging member of claim 22 further comprising at least one imaging layer.

24. The imaging member of claim 23 wherein said at least one imaging layer comprises at least one inkjet receiving layer.

25. The imaging member of claim 23 wherein said at least one imaging layer comprises at least one thermal dye receiving layer.

26. The imaging member of claim 23 wherein said at least one imaging layer comprises a photographic imaging member.

27. The imaging member of claim 22 wherein said base material is oriented.

28. The imaging member of claim 22 wherein said base material further comprises at least one additional matrix polymer.

29. The imaging member of claim 22 wherein said base material comprises at least one layer in a multilayer structure.

30. The imaging member of claim 29 wherein said imaging member comprises at least one voided layer.

31. The imaging member of claim 22 wherein said imaging member further comprises a support.

32. The imaging member of claim 30 wherein said support is paper.

* * * * *